United States Patent

Tanaka et al.

[11] Patent Number: 5,334,460
[45] Date of Patent: Aug. 2, 1994

[54] CU-PB SYSTEM ALLOY COMPOSITE BEARING HAVING OVERLAY

[75] Inventors: Tadashi Tanaka, Konan; Masaaki Sakamoto, Nagoya; Koichi Yamamoto, Komaki; Kenji Sakai, Ichinomiya, all of Japan

[73] Assignee: Daido Metal Company, Nagoya, Japan

[21] Appl. No.: 984,548

[22] Filed: Dec. 2, 1992

[30] Foreign Application Priority Data

Jan. 29, 1992 [JP] Japan .................. 4-014065

[51] Int. Cl.$^5$ .............................. B22F 7/04
[52] U.S. Cl. .................. 428/552; 428/553; 428/554; 428/562; 428/564; 428/565; 428/674; 428/676; 428/677; 75/231; 75/244; 75/246; 75/247
[58] Field of Search ........... 428/546, 547, 548, 551, 428/552, 553, 554, 562, 564, 565, 566, 567, 568, 539.5, 615, 674, 676, 677; 75/228, 231, 244, 245, 246, 247

[56] References Cited

U.S. PATENT DOCUMENTS

| | | | |
|---|---|---|---|
| 2,386,951 | 10/1945 | Howe | 29/149.5 |
| 2,970,933 | 2/1961 | Barera et al. | 117/71 |
| 3,004,333 | 10/1961 | Schaefer | 29/191.2 |
| 3,969,084 | 7/1976 | Watanabe et al. | 29/182.1 |
| 4,334,926 | 6/1982 | Futumura et al. | 75/230 |
| 4,889,772 | 12/1989 | Bergmann et al. | 428/547 |
| 4,916,026 | 4/1990 | Bergmann et al. | 428/555 |
| 4,959,274 | 9/1990 | Mori et al. | 428/555 |
| 5,004,581 | 4/1991 | Takagi et al. | 420/487 |
| 5,132,083 | 7/1992 | Takeda et al. | 420/472 |

FOREIGN PATENT DOCUMENTS

| | | |
|---|---|---|
| 0411882 | 7/1990 | European Pat. Off. . |
| 1198407A | 10/1989 | Japan . |
| 2118002A | 2/1990 | Japan . |
| 536980 | 12/1939 | United Kingdom . |

Primary Examiner—Donald P. Walsh
Assistant Examiner—Chrisman D. Carroll
Attorney, Agent, or Firm—Browdy and Neimark

[57] ABSTRACT

A Cu-Pb system composite bearing has three layers including a backing metal, a bearing alloy layer formed on the backing metal, and an overlay formed on the bearing alloy layer. The Cu-Pb bearing alloy contains 2 to 10% Ni and 0.05 to 1.0% B. An example of the composition of the Cu-Pb system bearing alloy consists of 0.5 to 8% Sn, 15 to 30% Pb, 0.2% or less P, 2 to 10% Ni, 0.05 to 1.0% B and the balance of Cu and unavoidable impurities. The Cu-Pb bearing alloy must have a hardness over HV80. Ni and B contained in the bearing alloy decrease the affinity of the Cu-Pb bearing alloy for tin in the overlay of a tin-containing lead alloy. The corrosion resistance of the bearing is improved by plating the both surfaces of the composite bearing with Sn, Pb or an alloy thereof.

17 Claims, 3 Drawing Sheets

FIG. 3

RESULT OF FATIGUE TEST

| KIND OF SPECIMEN | BEARING ALLOY | OVERLAY (wt%) | MAXIMUM LOAD WITHOUT SEIZURE (Mpa) 130 140 150 160 170 180 |
|---|---|---|---|
| INVENTION SPECIMEN | No. 1A | Pb-9%Sn-9%In | ~170 |
| INVENTION SPECIMEN | No. 2A | Pb-9%Sn-9%In | ~157 |
| COMPARATIVE SPECIMEN | No. 5A | Pb-9%Sn-9%In | ~149 |
| COMPARATIVE SPECIMEN | No. 6A | Pb-9%Sn-9%In | ~133 |

CU-PB SYSTEM ALLOY COMPOSITE BEARING HAVING OVERLAY

BACKGROUND OF THE INVENTION

1. Field of the Invention

The present invention relates to a heavy-duty bearing material which is increasingly required with a recent increase in the power of an internal combustion engine.

2. Description of the Related Art

A conventional copper-lead bearing alloy material generally used for an internal combustion engine consists of a Cu-Pb system or Cu-Sn-Pb system alloy. This alloy has an overlay (surface layer) provided on the surface thereof and consisting of a Pb-Sn alloy, a Pb-Sn-Cu alloy, a Pb-Sn-In alloy or the like. Particularly, such a copper-lead bearing alloy material often has an intermediate layer (barrier layer) consisting of nickel or the like and interposed between the alloy and the overlay in order to prevent the diffusion of tin or indium contained in the overlay into the alloy.

A sliding member has a sintered copper alloy layer to which 1 to 20% by weight of Ni-B compound is added for improving the wear resistance of a cylindrical bush without an overlay, as disclosed in Japanese Patent Application of Serial No. 2-333283 which had not been published at the filing time of the parallel patent application in Japan corresponding to the present application.

In order to prevent the diffusion of tin, indium or the like into the copper-lead bearing alloy, which is contained in an overlay provided on the surface of a copper-lead bearing alloy, a barrier nickel layer (anti-diffusion layer) is generally interposed between the copper-lead bearing alloy and the overlay. However, when the barrier nickel layer is present, there is a problem that if the overlay is worn out during slide-contacting with a shaft of mating sliding member, the barrier nickel layer having poor anti-seizure property is exposed and causes seizure with the mating sliding member. In addition, the production cost is increased by providing the barrier layer. On the other hand, when the barrier nickel layer is lacking, there is a problem that tin, indium or the like contained in the overlay diffuses into the copper-lead alloy and brings about decreases in strength of the overlay and corrosion resistance property.

A bearing alloy material having excellent fatigue resistance, wear resistance and higher strength than that of conventional Cu-Sn-Pb system alloy materials is increasingly demanded with recent increases in the power and performance of engines.

In order to improve the strength and fatigue resistance of a lead-bronze alloy which is known as an engine bearing material, tin content may be increased while decreasing lead content. However, although this expedient prevents diffusion of tin contained in the overlay into the lead-bronze alloy, it causes problems that the heat conductivity of the lead-bronze alloy is significantly deteriorated by an increase in the tin content, and that the anti-seizure property and embeddability of foreign substances (hereinafter referred to as "embeddability") are deteriorated by a decrease in the lead content.

SUMMARY OF THE INVENTION

A primary object of the present invention is to solve the above problems of conventional bearing alloys and provide a copper-lead alloy bearing material as a sliding material which has excellent fatigue resistance, anti-seizure property and embeddability and which prevents the components such as tin, indium or the like contained in an overlay from easily diffusing and entering a copper-lead alloy even if a nickel intermediate layer deteriorating the anti-seizure property is absent between the copper-lead alloy and the overlay.

In order to achieve the object, according to one aspect of the present invention, there is provided the following copper-lead alloy bearing:

A composite bearing comprising three layers including a backing metal, a copper-lead system bearing alloy layer formed on the backing metal and a tin-containing lead alloy overlay formed on the bearing alloy layer, the copper-lead bearing alloy containing, by weight, 2 to 10% of nickel and 0.05 to 1.0% of boron (B). The use of a copper-lead system bearing alloy having the above composition effectively prevents the tin contained in the overlay lead alloy from diffusing into the copper-lead system bearing alloy. In this case, the copper-lead system bearing alloy must have a hardness above HV80.

A preferable example of the copper-lead system bearing alloy consists of, by weight, 0.5 to 8% of tin, 15 to 30% of lead, 0.2% or less of phosphorus, 2 to 10% of nickel, 0.05 to 1.0% of boron and the balance of copper and unavoidable impurities.

Examples of tin-containing lead alloys that can be preferably used for forming the overlay include an alloy consisting of, by weight, 3 to 18% of tin and the balance of lead and unavoidable impurities, and an alloy consisting of, by weight, 3 to 18% of tin, at least one of 15% or less of indium and 5% or less of copper, and the balance of lead and unavoidable impurities.

Either an unplated steel plate or a copper-plated steel plate may be used as the backing metal for the bearing alloy layer.

In order to improve the corrosion resistance of the bearing, it is effective to plate both the outer and inner surfaces of the copper-lead alloy bearing, i.e., the surfaces of the overlay and of the backing metal, with tin, lead or an alloy thereof. It is recommended that the thickness of each of the plated layer is 3 μm or less.

In accordance with another aspect of the present invention, there is provided a copper-lead bearing alloy which can be used in combination with a tin-containing lead alloy overlay and which consists of, by weight, 0.5 to 8% of tin, 15 to 30% of lead, 0.2% or less of phosphorus, 2 to 10% of nickel, 0.05 to 1% of boron, and the balance of copper and unavoidable impurities.

BRIEF DESCRIPTION OF THE DRAWINGS

FIG. 3 is a table showing the results of fatigue tests conducted in examples.

DETAILED DESCRIPTION OF THE INVENTION

The reasons for defining the composition of a copper-lead alloy bearing of the present invention are as described below.

Copper-Lead Bearing Alloy (1) Nickel: 2 to 10% by weight

With a nickel content of less than 2% by weight, the strength of the alloy is insufficient, and it is impossible to sufficiently prevent the diffusion of tin contained in the overlay into the copper alloy. With a nickel content over 10% by weight, the alloy becomes excessively hard, and the conformability of the bearing with a shaft serving as a mating member deteriorates.

(2) Boron: 0.05 to 1.0% by weight

Boron is present as a compound with nickel, promotes the sintering property and contributes to improvement in the wear resistance. With a boron content of less than 0.05%, the amount of the Ni-B compound is small. With a boron content over 1.0%, the Ni-B compound is present in a large amount and thus does not contribute to the above effect. In addition, the hardness of the alloy is excessively increased, the toughness deteriorates, and the production cost is increased.

(3) Tin: 0.5 to 8% by weight

With a tin content of less than 0.5%, the strength of the alloy is insufficient. With a tin content over 8% by weight, the alloy becomes excessively strong, and the heat conductivity and anti-seizure property deteriorate.

(4) Lead: 15 to 30% by weight

With a lead content of less than 15%, the bearing properties such as the anti-seizure property and the embeddability deteriorate. With a lead content over 30%, the strength of the alloy is decreased.

(5) Phosphorus: 0.2% by weight or less

With a phosphorus content over 0.2%, the alloy becomes excessively hard, and the conformability with a shaft, which is a property required to a bearing, deteriorates.

(6) Hardness of copper-lead system bearing alloy:

The copper-lead system bearing alloy is required to have Vickers hardness (HV) of 80 or more. With a hardness of less than HV 80, the strength and hardness of the alloy are insufficient, and the fatigue resistance and wear resistance deteriorate.

Overlay (7) Outermost surface plated layer: 3 μm or less

An outermost surface plated layer is provided for preventing corrosion of the surface of the backing metal and improving the corrosion resistance of the surface of the bearing alloy. Even if the thickness of the layer exceeds 3 μm, the effects are the same, and the production cost is increased.

(8) Tin: 3 to 18% by weight

With a tin content of less than 3%, the strength of the overlay is insufficient, and the corrosion resistance deteriorates. With a tin content over 18%, the melting point of the overlay is decreased, thereby easily causing the wiping phenomenon (melt flowing phenomenon).

(9) Indium: 15% by weight or less

With an indium content over 15%, the melting point of the overlay is excessively decreased.

(10) Copper: 5% by weight or less

With a copper content over 5%, the overlay becomes hard and brittle.

Figure 1:
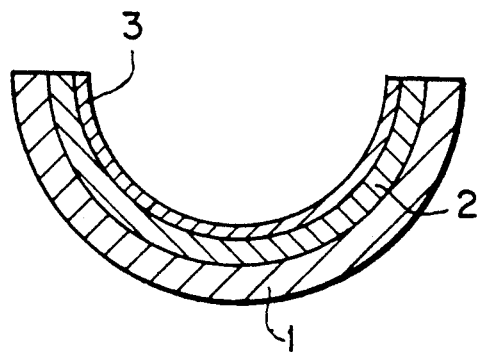
FIG. 1 shows an example of the structure of a bearing having a semicircular sectional form and comprising three layers including a backing metal, a bearing alloy layer and an overlay in accordance with an embodiment of the present invention.
Figure 2:
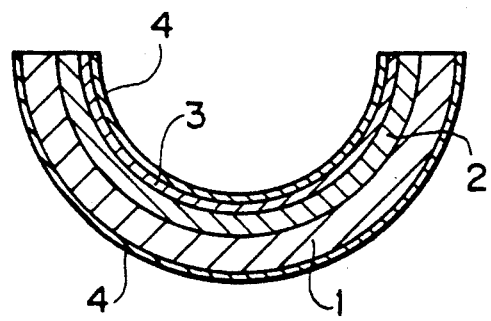
FIG. 2 is an example of a bearing of the present invention in which both surfaces of the bearing shown in FIG. 1 are subjected to outermost surface plating.

FIGS. 1 and 2 show two examples of the structure of a bearing according to the present invention. The bearing shown in FIG. 1 comprises a backing metal of steel 1, a copper-lead bearing alloy layer 2 integrally formed on a surface of the backing metal, and an overlay layer 3 integrally formed on the bearing alloy layer 2. The bearing shown in FIG. 2 further comprises a plated film 4 consisting of tin, lead or an alloy thereof and formed on both surfaces of the bearing shown in FIG. 1.

The present invention is described in detail below with reference to experiments.

EXPERIMENT 1

A powder consisting of a copper-lead bearing alloy having each of the compositions shown in Table 1 was distributed on a steel plate having a copper-plated surface. The plate was then placed in a furnace of reducing atmosphere to be subjected to sintering treatment at a temperature of 700° to 900° C. for 10 to 30 minutes.

After sintering, the composite plate was rolled and then sintered and rolled again to obtain a sintered bimetal (dimensions: 1.58 mm of bimetal thickness, 1.23 mm of backing metal thickness, 130 mm of width). Sintering and rolling may be of course repeated several times as occasion demands.

The thus-obtained bimetal was then formed into a bearing having a semicircular sectional shape by pressing and machining to obtain each of invention specimens (Nos. 1 to 4) and comparative specimens (Nos. 5 to 8). The results of measurement of the hardness and tensile strength of the specimens are shown in Table 1.

Although the bearing of the present invention had an overlay, the measurement was made in a state without the overlay.

EXPERIMENT 2

An overlay (20 μm of thickness) having the composition, Pb-9%Sn-9%In, was formed on the bearing obtained by the same process as that described above in Experiment 1 by an electroplating method to obtain each of invention specimens (Nos. 1A and 2A) and comparative specimens (5A and 6A) (specimen Nos. respectively correspond to the specimen Nos. shown in Table 1). The results of fatigue tests of the specimens are shown in FIG. 3, and the test conditions are shown in Table 2.

EXPERIMENT 3

A nickel layer (1.5 μm of thickness) was formed on the bearing obtained by the same process as that described above in Experiment 1 by electroplating, and an overlay (20 μm of thickness) having the composition, Pb-9%Sn-9%In (i.e. No Bi) was then formed on the nickel layer by electroplating to obtain a comparative specimen (No. 5B).

Figure 4:
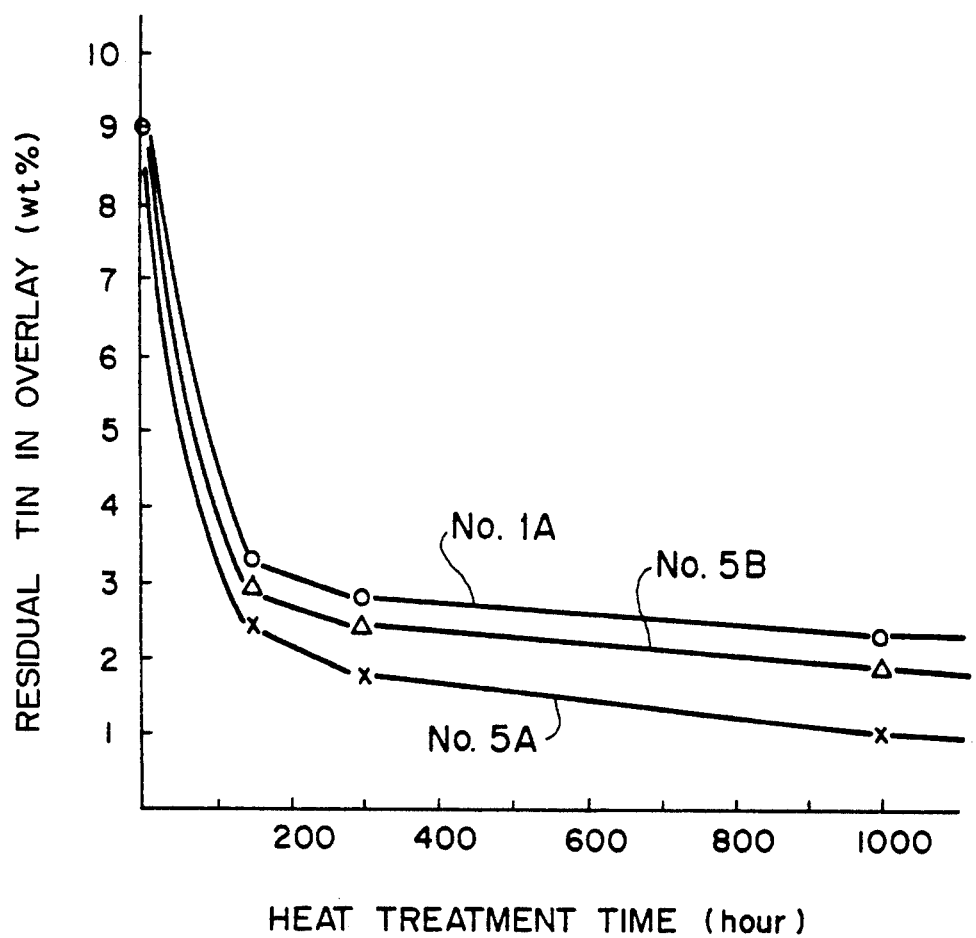
FIG. 4 is a graph showing the diffusion state of tin in an overlay.

Each of the invention specimen No. 1A and comparative specimen Nos. 5A and 5B was subjected to a heat treatment diffusion test at a temperature of 165° C. for a maintenance time which was set to 150, 300 and 1000 hours. The amount of tin decreased by diffusion into the copper-lead bearing alloy was measured by measuring the amount of tin remaining in the overlay after each of the maintenance times passed. The results of the measurement are shown in FIG. 4. Table 3 simply shows the types of the specimens used in the diffusion test.

As seen from the results of the diffusion test shown in FIG. 4, the invention specimens each formed by using a copper-lead alloy containing nickel and boron exhibit the effect of preventing diffusion of tin in the overlay into the bearing alloy. The effect is equivalent or superior to that of a material having nickel barrier layer formed at the boundary between the overlay and the bearing alloy. It is also found from the results of the fatigue test of the bearing alloy that the strength of the invention specimens is increased by adding nickel and boron thereto, and that the invention specimens have excellent fatigue resistance.

The results of the test shows that the direct formation of an overlay containing tin on a copper-lead alloy containing Ni-B effectively prevents tin diffusion, and an invention specimen can preferably be used as an engine bearing having a semicircular section shape. Namely, the addition of Ni-B to the copper alloy matrix decreases the affinity of the copper alloy for the tin contained in the overlay and thus prevents the tin diffusion. This effect causes the tin in the overlay to be maintained therein for a long term even if the nickel barrier layer is absent at the boundary between the copper alloy and the overlay. In addition, Ni-B uniformly distributes in the copper alloy matrix and thus has the effects of strengthening the matrix and improving the bearing characteristics such as the fatigue resistance and wear resistance.

As will be apparent from the above, the present invention enables a nickel barrier layer which deteriorates the anti-seizure property to be omitted by preventing the diffusion of tin contained in an overlay into a copper alloy. The prevent invention also realizes improvement in the fatigue resistance and anti-seizure property of a copper-lead bearing alloy material by addition of Ni-B.

TABLE 1

Chemical Composition and Mechanical Properties of Bearing Alloy

| Type | Specimen No. | Chemical Composition of bearing alloy (wt %) | | | | | | Hardness HVS | Tensile strength MPa |
|---|---|---|---|---|---|---|---|---|---|
| | | Cu | Sn | Pb | Ni | B | P | | |
| A | 1 | Bal. | 2.0 | 23 | 4.2 | 0.4 | 0.1 | 106 | 230 |
| | 2 | Bal. | 0.6 | 29 | 2.3 | 0.06 | 0.03 | 83 | 206 |
| | 3 | Bal. | 2.0 | 16 | 9.0 | 0.9 | 0.17 | 114 | 257 |
| | 4 | Bal. | 7.8 | 16 | 2.3 | 0.06 | 0.03 | 115 | 260 |
| B | 5 | Bal. | 2.0 | 23 | 1.0 | 0.02 | 0.1 | 82 | 203 |
| | 6 | Bal. | 0.4 | 32 | 1.3 | 0.03 | 0.02 | 71 | 178 |
| | 7 | Bal. | 2.0 | 14 | 11.0 | 1.2 | 0.23 | 121 | 269 |
| | 8 | Bal. | 8.7 | 14 | — | — | 0.10 | 109 | 233 |

A: Invention Specimen
B: Comparative Specimen

TABLE 2

| Fatigue Test Conditions | |
|---|---|
| Test method | Dynamic load fatigue tester |
| Number of rotation | 3250 rpm |
| Test time | 20 hours |
| Peripheral velocity | 9.1 m/sec |
| Lubricant oil | SAE 20 |
| Oil temperature | 100° C. |

TABLE 3

| Bearing alloy | Ni barrier | Overlay |
|---|---|---|
| No. 1A | Absent | Pb-9%Sn-9%In |
| No. 5B | Present | Pb-9%Sn-9%In |
| No. 5A | Absent | Pb-9%Sn-9%In |

What is claimed is:

1. A Cu-Pb system alloy composite bearing with an overlay comprising three layers including a backing metal layer of steel a copper-lead system bearing alloy layer formed on said backing metal layer, and a tin-containing lead alloy overlay formed on said bearing alloy layer, wherein said copper-lead system bearing alloy layer contains, by weight, 2 to 10% of nickel and 0.05 to 1.0% of boron so as to prevent the tin contained in said lead alloy overlay from diffusing into said copper-lead system bearing alloy layer, at least a part of said nickel and boron being in the form of Ni-B, and said copper-lead system bearing alloy layer has a hardness greater than NV80.

2. A Cu-Pb system alloy composite bearing with an overlay according to claim 1, wherein said copper-lead system bearing alloy contains, by weight, 0.5 to 8% of tin, 15 to 30% of lead, 0.2% or less of phosphorus, 2 to 10% of nickel, and 0.05 to 1.0% of boron, and said bearing alloy layer is formed by sintering an alloy powder.

3. A Cu-Pb system alloy composite bearing with an overlay according to claim 1, wherein the tin-containing lead alloy which forms said overlay is an alloy consisting, by weight, of 3 to 18% of tin and the balance of lead and unavoidable impurities.

4. A Cu-Pb system alloy composite bearing with an overlay according to claim 1, wherein the tin-containing lead alloy which forms said overlay is an alloy consisting, by weight, of 3 to 18% of tin, at least one of 15% or less of indium and 5% or less of copper, and the balance of lead and unavoidable impurities.

5. A Cu-Pb system alloy composite bearing according to claims 1, wherein a plating layer of tin, lead or an alloy thereof having a thickness of 3 μm or less is formed on both the inner and outer surfaces thereof, i.e., the surfaces of said overlay and of said backing metal.

6. A Cu-Pb system alloy composite bearing with an overlay according to claim 2, wherein the tin-containing lead alloy which forms said overlay is an alloy consisting, by weight, of 3 to 18% of tin, at least one of 15% or less of indium and 5% or less of copper, and the balance of lead and unavoidable impurities.

7. A Cu-Pb system alloy composite bearing according to claim 2, wherein a plating layer of tin, lead or an alloy thereof having a thickness of 3 μm or less is formed on both the inner and outer surfaces thereof, i.e. the surfaces of said overlay and of said backing metal.

8. A Cu-Pb system alloy composite bearing according to claim 1, wherein the tin-containing lead alloy which forms said overlay is an alloy consisting essentially of, by weight, about 9% of tin with the balance of lead and unavoidable impurities, up to 15% of indium and up to 5% of copper.

9. A composite bearing comprising:
(1) a backing metal layer;

(2) a Cu-Pb system bearing alloy formed on said backing metal layer, said Cu-Pb bearing alloy containing 0.05 to 1.0% of boron and an amount sufficient of nickel in the range of 2-10% to prevent any tin contained in an overlay from diffusing into said Cu-Pb system bearing alloy layer, at least a portion of said nickel and said boron being in a combined state as Ni-B, said Cu-Pb system bearing alloy layer having a hardness greater than NV80; and (3) an overlay formed on said bearing alloy layer consisting essentially of 3-18% by weight of tin and the balance being lead and unavoidable impurities, up to 15% by weight of indium, and up to 5% by weight of copper.

10. A Cu-Pb system alloy composite bearing with an overlay according to claim 9, wherein said backing metal is a steel material or a steel material which is previously plated with copper as an underlayer and on which said copper-lead system bearing alloy layer is expected to be formed.

11. A Cu-Pb system alloy composite bearing with an overlay according to claim 10, wherein said copper-lead system bearing alloy contains, by weight, 0.5 to 8% of tin, 15 to 30% of lead, 0.2% or less of phosphorus, 2 to 10% of nickel, and 0.05 to 1.0% of boron, and said bearing alloy layer is formed by sintering an alloy powder.

12. A Cu-Pb system alloy composite bearing with an overlay according to claim 10, wherein the tin-containing lead alloy which forms said overlay is an alloy consisting, by weight, of 3 to 18% of tin, at least one of 15% or less of indium and 5% or less of copper, and the balance of lead and unavoidable impurities.

13. A Cu-Pb system alloy composite bearing with an overlay according to claim 11, wherein the tin-containing lead alloy which forms said overlay is an alloy consisting, by weight, of 3 to 18% of tin, at least one of 15% or less of indium and 5% or less of copper, and the balance of lead and unavoidable impurities.

14. A Cu-Pb system alloy composite bearing according to claim 10, wherein a plating layer of tin, lead or an alloy thereof having a thickness of 3 $\mu$m or less is formed on both the inner and outer surfaces thereof, i.e. the surfaces of said overlay and of said backing metal.

15. A Cu-Pb system alloy composite bearing according to claim 11, wherein a plating layer of tin, lead or an alloy thereof having a thickness of 3 $\mu$m or less is formed on both the inner and outer surfaces thereof, i.e. the surfaces of said overlay and of said backing metal.

16. A composite bearing consisting essentially of:
(1) a backing metal layer;
(2) a Cu-Pb system bearing alloy formed on said backing metal layer, said Cu-Pb bearing alloy containing 0.05 to 1.0% of boron and an amount sufficient of nickel in the range of 2 to 10% to prevent any tin contained in an overlay from diffusing into said Cu-Pb system bearing alloy layer, at least a portion of said nickel and said boron being in a combined state as Ni-B, said Cu-Pb system bearing alloy layer having a hardness greater than NV80; and
(3) a tin-containing lead alloy overlay formed on said bearing alloy layer, said tin-containing lead alloy overlay containing no bismuth.

17. A Cu-Pb system alloy composite bearing with an overlay according to claim 16, wherein the tin-containing lead alloy which forms said overlay is an alloy consisting, by weight, of 3 to 18% of tin and the balance of lead and unavoidable impurities.

* * * * *